United States Patent [19]
Even-Sturlesi et al.

[11] Patent Number: 5,471,047
[45] Date of Patent: Nov. 28, 1995

[54] MATRIX IMAGING METHOD AND SYSTEM USING A MATRIX DETECTOR WITH A PLURALITY OF SEQUENTIALLY ILLUMINATED DETECTOR ELEMENTS FOR MEASURING RADIATION OF SEPARATE PORTIONS OF A SCENE BEING VIEWED

[75] Inventors: Doron Even-Sturlesi, Timrat; Micha Oron, Kiryat Yam, both of Israel

[73] Assignee: State of Israel Ministry of Defense, Armament Development Authority Rafael, Haifa, Israel

[21] Appl. No.: 100,733

[22] Filed: Jul. 30, 1993

[30] Foreign Application Priority Data

Jul. 31, 1992 [IL] Israel ............................ 102696

[51] Int. Cl.⁶ .................................... H01J 40/14
[52] U.S. Cl. ............................ 250/208.1; 250/332
[58] Field of Search .................... 348/164, 219; 250/332, 208.1, 332, 352

[56] References Cited

U.S. PATENT DOCUMENTS

| | | |
|---|---|---|
| 4,660,082 | 4/1987 | Tomohisa et al. . |
| 4,712,010 | 12/1987 | Alm .................... 250/332 |
| 4,821,337 | 4/1989 | Alm .................... 382/58 |
| 4,879,598 | 11/1989 | Seto .................... 358/113 |
| 4,963,963 | 10/1990 | Dorman ................ 250/332 |
| 4,965,447 | 10/1990 | Bly et al. . |
| 4,972,085 | 11/1990 | Weber et al. .......... 250/332 |
| 5,075,553 | 12/1991 | Noble et al. .......... 250/332 |
| 5,134,474 | 7/1992 | Hanafusa et al. ..... 250/332 |
| 5,136,421 | 8/1992 | Sagan ................... 250/353 |

FOREIGN PATENT DOCUMENTS

| | | |
|---|---|---|
| 0410745 | 1/1991 | European Pat. Off. . |
| 0468474 | 1/1992 | European Pat. Off. . |
| 0474479 | 3/1992 | European Pat. Off. . |
| 2248153 | 3/1992 | United Kingdom . |
| 2250884 | 6/1992 | United Kingdom . |

*Primary Examiner*—Stephone B. Allen
*Attorney, Agent, or Firm*—Helfgott & Karas

[57] ABSTRACT

During a portion of each frame, the detector elements of a matrix detector are illuminated at the average intensity of the scene. For each detector element, the ratio of the actual average intensity of the scene to the detector element's measured value of the average intensity is used to calibrate the detector element's measured values during the rest of the frame. In a further embodiment, more accurate calibration of the detector element's measured values is provided by additionally using the slope of the detector element's calibration curve in the calibration.

48 Claims, 5 Drawing Sheets

\* FOR FIG.7

MATRIX IMAGING METHOD AND SYSTEM USING A MATRIX DETECTOR WITH A PLURALITY OF SEQUENTIALLY ILLUMINATED DETECTOR ELEMENTS FOR MEASURING RADIATION OF SEPARATE PORTIONS OF A SCENE BEING VIEWED

FIELD OF THE INVENTION

The present invention relates to the field of stationary (staring) imaging systems, and methods of improving the performance of such imaging systems.

BACKGROUND OF THE INVENTION

In stationary (staring) imaging systems a scene is typically optically focused on a matrix detector which is composed of a plurality of detector elements arranged in a matrix. The scene is focused onto the plane of the matrix detector such that each of the detector elements is irradiated by a particular portion of the scene, and each detector element measures the quantity of the radiation it receives from that portion of the scene.

Different detector elements generally produce different measured values for the same light input. If uncorrected, this lack of uniformity among the detector elements gives rise to fixed pattern noise which can seriously affect system performance. In the infrared region, for example, this fixed pattern noise can readily mask the low contrast images common in that portion of the spectrum.

The standard solution to this problem is to calibrate each of the individual elements in the matrix detector. One prior art method of calibration is shown in FIG. 1. In this method, a known high value of radiation ($H_v$) and a known low value of radiation ($L_v$) are supplied to each detector element, and the element's measured values are plotted. A 'calibration line' 15 is drawn through the two points on the graph, and this line is used to convert measured values to actual values during operation of the detector at values intermediate to $H_v$ and $L_v$. In general each element will have a different calibration curve.

This prior art method requires a separate calibration procedure, however, and therefore it cannot be performed in real time (i.e. while the detector is imaging the scene). It is desirable to perform the calibration in real time because, due to drift, the calibration of the detector elements changes over time, and a 'calibration line' calculated during a separate calibration procedure, may no longer be accurate during operation of the detector. Also, this method uses a straight line to approximate the detector element's behavior. In reality, however, the detector element's response is not linearly dependent on the energy flux and varies from element to element. This method, therefore, introduces inaccuracies into the calibration for values far from $H_v$ and $L_v$.

SUMMARY OF THE INVENTION

Therefore, it is an object of an embodiment of the invention to provide a calibration method which operates in real time.

It is an object of an embodiment of the invention to provide a calibration method which calibrates the system at a temperature dependent on the scene.

It is an object of an embodiment of the invention to perform the calibration while maintaining 100% cold shield efficiency.

It is an object of an embodiment of the invention to increase the resolution of the matrix detector.

In a preferred embodiment, the present invention accomplishes the above described objects by determining, during a portion of each frame, the value which each detector element measures when illuminated by light at the average intensity of the scene. Each detector element's measured value at that light intensity represents one point on the detector element's measured value vs. actual value calibration curve. The difference between the actual value and the measured value at that point on the curve is used to convert the detector element's measured values to actual values during the rest of the frame.

In a further preferred embodiment, the invention provides more accurate calibration by additionally calculating the slope of the calibration curve at the average intensity of the scene. By additionally using the slope of the calibration curve in the calibration, the invention accounts for the difference between the average intensity of the scene and the temperature of the portion of the scene imaged by the detector element.

There is thus provided, in accordance with a preferred embodiment of the present invention, a detector for viewing a scene including a matrix of detector elements and apparatus for sequentially illuminating the matrix of elements for first and second time periods. Each element views a separate portion of the scene during the first time period and each element is illuminated by a light intensity level substantially equal to the average intensity of the scene during the second time period.

In a preferred embodiment of the invention the detector provides respective first and second measured values of the illumination received by each detector element during the first and second time periods, generates a calibration factor for each of the detector elements based on the second measured value for that detector and corrects each detector element's measured value for the first time period using the calibration factor of the detector element.

Preferably, the calibration factors are generated by calculating the average of the measured values of the detector elements for the second time period and dividing the average value by each detector element's measured value for the second time period.

Preferably, the correction includes adding the measured value of the detector element for the first time period to the calibration factor for each detector element to form a corrected measured value for the detector element.

In a preferred embodiment of the invention the detector includes apparatus for sequentially illuminating the matrix of elements for a third time period such that each element is equally illuminated by a light intensity level related to but not equal to the average intensity of the scene.

Preferably, the detector provides respective first, second and third measured values of the illumination received by each detector element during the first, second and third time periods, generates a calibration formula for each of the detector elements based on the measured values for the second and third time periods, and corrects each detector element's measured value for the first time period using the calibration formula of the detector element.

In a preferred embodiment of the invention the detector provides respective first, second and third measured values of the illumination received by each detector element during the first, second and third time periods, generates a calibration formula for each of the detector elements based on the measured values for the second and third time periods, (wherein the calibration formula includes a linear relationship $M_c=S*M_u+K$, between the measured values, $M_u$, and corrected measured values $M_c$ for each detector element, where K is a constant) and corrects each detector element's measured value for the first time period using the calibration formula of the detector element.

Preferably the calculation of the slope, S, of the linear relationship includes calculating the average of the measured values for the second time period and an average corrected value for the third time period.

In a preferred embodiment of the invention the slope, S, of each detector element equals $S=(M_2-M_3)/(A_2-A_3)$, where $A_2$ and $A_3$ are the average values for the second and third time periods respectively and $M_2$ and $M_3$ are the measured values of the detector elements for the second and third time periods respectively.

Preferably $K=(A_2-M_2*S)$.

In a preferred embodiment of the invention during the third time period the matrix is illuminated with illumination having an intensity level which is related by a constant to the light intensity level during the first time period. In one preferred embodiment the intensity level during the third time period which is equal to a constant multiplied by the light intensity level during the second time period. Alternatively, the intensity level is equal to a constant added to the light intensity level during the second time period.

In a preferred embodiment of the invention the detector includes apparatus for sequentially varying the portion of the scene viewed by each detector element during the first time period by shifting the illumination received from the scene. When the distance between the centers of two adjacent detector elements in the matrix is d, the apparatus for sequentially varying preferably sequentially shifts the illumination received from the scene a distance ½ d in a first direction, shifting the illumination received from the scene a distance ½ d in a second direction perpendicular to the first direction and apparatus for shifting the illumination received from the scene a distance ½ d in the first direction and ½ d in the second direction.

There is further provided in a preferred embodiment of the invention a detector for detecting illumination emitted by a scene, including a planar matrix of detector elements, each of the detector elements providing an output value representative of the amount of light received thereby during a period of time, optics for focusing the illumination emitted by the scene onto the detector plane and a rotatable wheel located in the path of the illumination. The rotatable wheel includes a first section having optical lenses which spread the illumination emitted by the scene such that each of the detector elements is illuminated by a light intensity level substantially equal to the average intensity of the scene and a second section having optics which allow the illumination emitted by the scene to pass to the detector plane without modification.

In a preferred embodiment of the invention the detector further includes a processor connected to receive the values provided by the detector elements.

In a preferred embodiment of the invention the rotatable wheel further includes a third section having optics which shift the illumination emitted by the scene in a first direction, a fourth section having optics which shift the illumination emitted by the scene in a second direction perpendicular to the first direction, and a fifth section having optics which shift the illumination emitted by the scene in both the first and second directions.

Preferably, the rotatable wheel further includes an additional section including optical lenses identical to those of the first section; and the detector further includes an additional light source operative to supply additional light to the matrix detector only when the light from the scene is transmitted through the additional section of the filter.

There is further provided, in a preferred embodiment of the invention a detector for detecting illumination emitted by a scene, including a planar matrix of detector elements, optics for focusing the illumination emitted by the scene onto the detector plane and a plurality of optical sections, arranged so that the light emitted by the scene passes through only one section at a time. The sections include a first section having optical lenses which transmit the illumination emitted by the scene such that each of the detector elements is illuminated by a light intensity level substantially equal to the average intensity of the scene, and a second section having optics which allow the illumination emitted by the scene to pass planar matrix via each of the plurality of al to the detector plane without modification; and apparatus for sequentially supplying the light from the scene to sections.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 2:
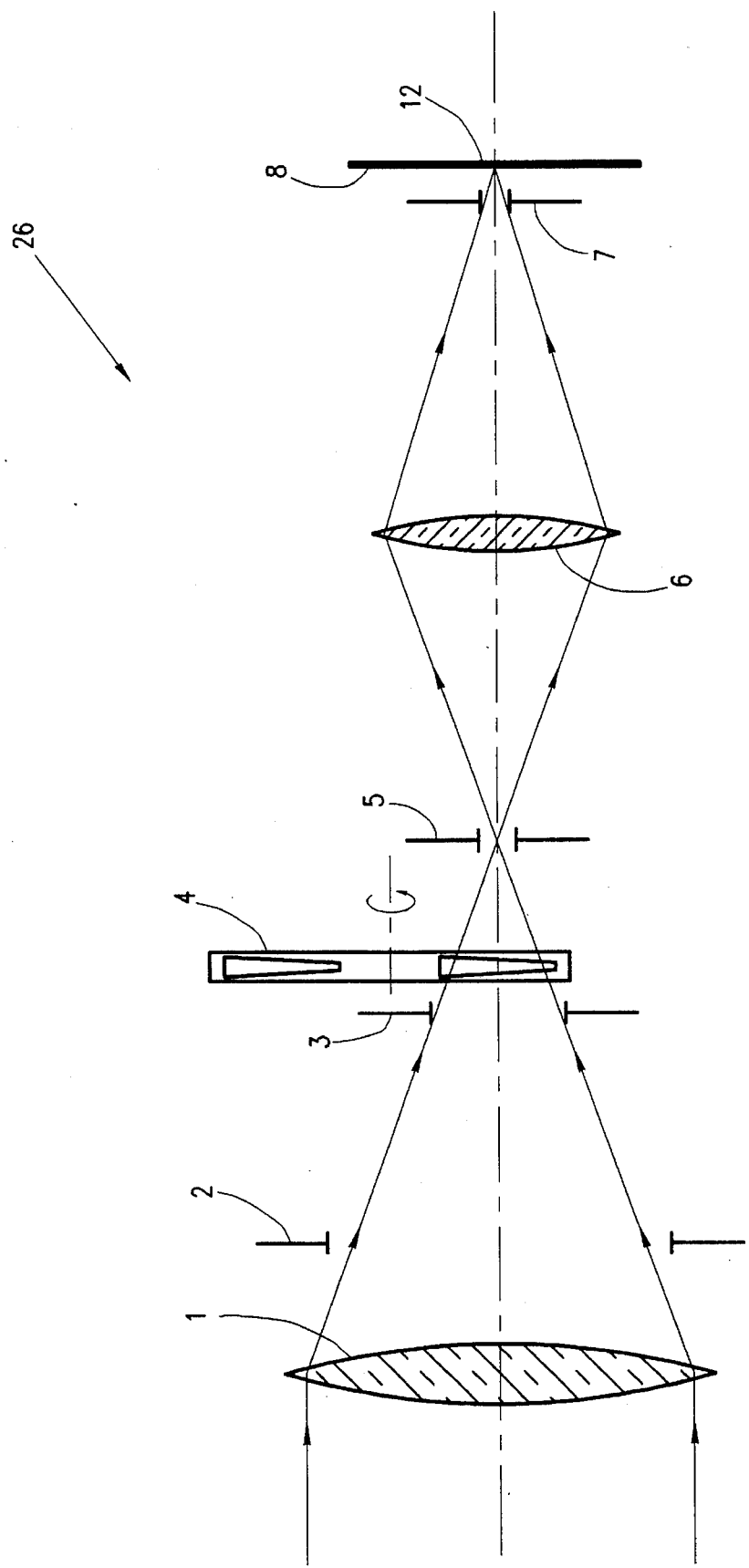
FIG. 2 shows a preferred embodiment of the detector system of the present invention.

As shown in FIG. 2, radiation, preferably infra-red radiation, from a scene, is received by a detector 26 where it is focused by an objective lens 1 through an entrance pupil 2, an intermediate pupil 3, and a rotating transmitting wheel 4 to a first focus point at a field stop 5. The radiation is further focused by a relay lens 6 through a cold shield 7 and onto a detector plane 8 which includes a detector matrix 12 comprising a plurality of detector elements. Cold shield 7 also functions as an aperture stop and exit pupil. Cold shield 7 and detector matrix 12 are preferably cooled to reduce thermal noise, as is well known in the art.

Figure 3:
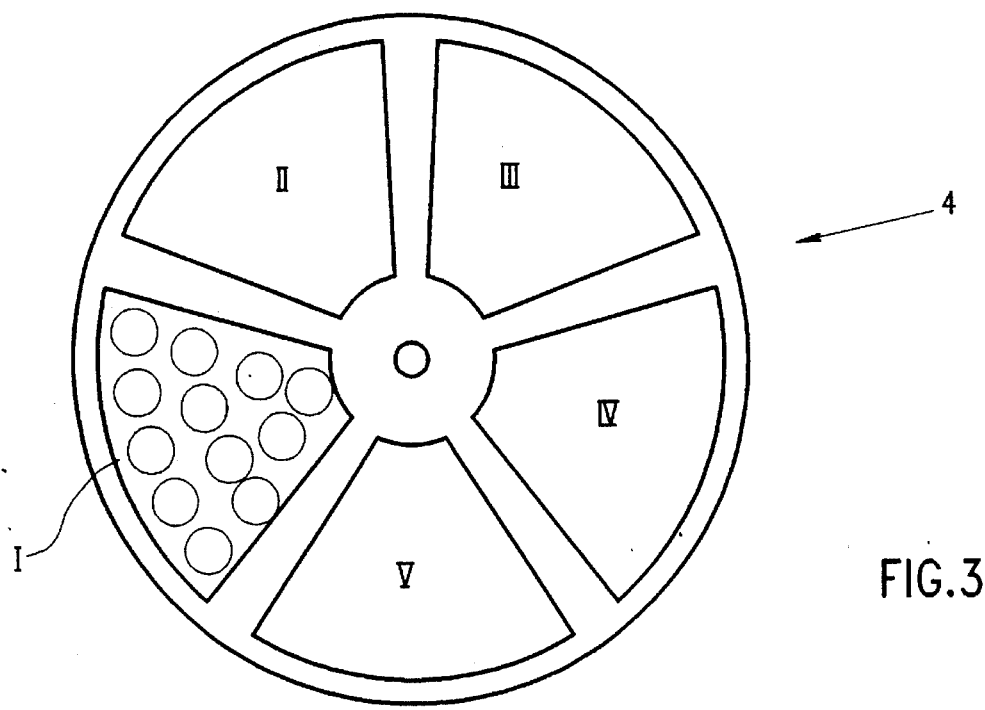
FIG. 3 shows a front view of transmitting wheel according to a preferred embodiment of the present invention.

As shown in FIG. 3, transmitting wheel 4 is composed of five sections I–V. Section I contains diffractive or refractive optics, such as a plurality of Fresnel lenses. Each Fresnel lens evenly illuminates the entire matrix 12 with light from a portion of the scene, so that all the detector elements are illuminated equally by the light from the scene. Since the total radiation received from the scene is spread evenly over matrix 12, each element of matrix 12 is illuminated by a light intensity level substantially equal to the average intensity of the scene. Sections II–V transmit the light from the scene to the matrix detector. The purpose and operation of these four sections of transmitting wheel 4 will be described in detail below.

In a preferred embodiment, transmitting wheel 4 is located at intermediate stop 3, rather than close to objective lens 1. This allows transmitting wheel 4 to be smaller than objective lens 1, and makes construction of transmitting wheel 4 mechanically simpler.

Figure 4:
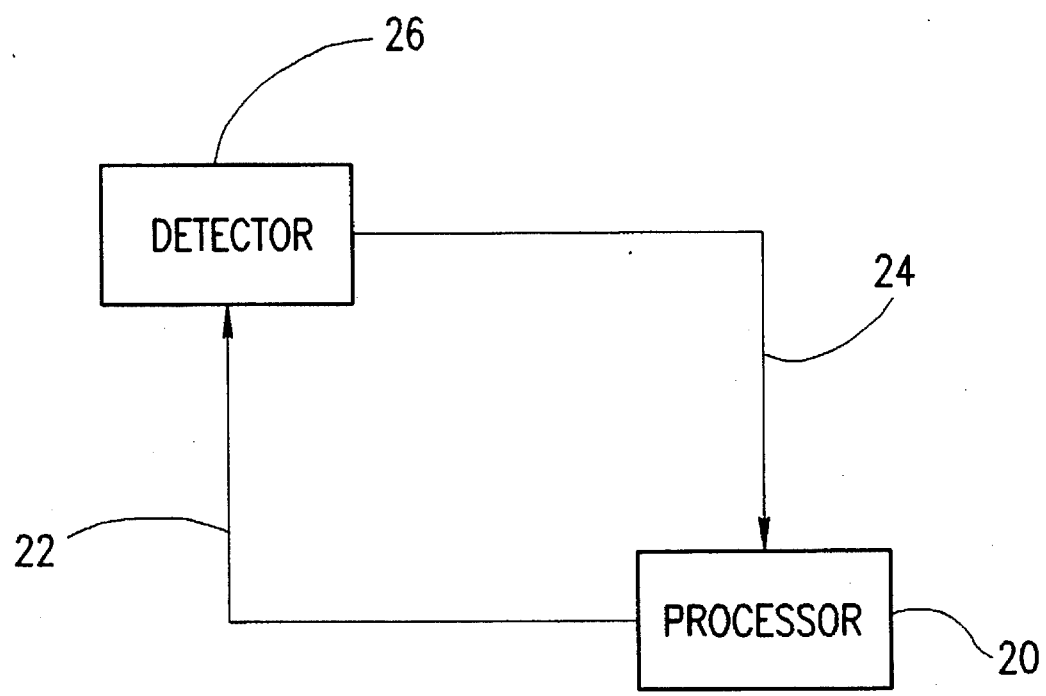
FIG. 4 shows a block diagram of the detector system of the present invention.

During operation of the detector, a processor 20, shown in FIG. 4, supplies control signals to detector 26 over a line 22, which cause transmitting wheel 4 to complete one rotation per frame. In a preferred embodiment, a frame is 30 msec., in which case the radiation is transmitted through each of the five sections for 6 msec. Six msec. is generally a desired time for the detector elements to measure the radiation from the scene, and therefore, the frame can be subdivided in this way without affecting the accuracy of the detector's measurements.

As was described above, when the radiation is transmitted through section I of transmitting wheel 4, each element of matrix 12 is illuminated by a light intensity substantially equal to the average intensity of the scene. Processor 20, shown in FIG. 4, receives the values measured during this period by each detector element over a line 24, and calculates the average measured value for the whole matrix ($A_f$). A calibration factor (C) is formed for each detector element by subtracting this average value from the detector element's measured value ($M_f$). This calibration factor, $C=M_f-A_f$, is used during the rest of the frame (during which the radiation is transmitted through sections II–V of transmitting wheel 4) to correct the value measured by each detector element. The corrected values are calculated as:

*corrected value=(measured value)+(C).*

In this way, the invention achieves the objects of using the average temperature of the entire scene to calibrate each detector element in real time, while maintaining 100% cold shield efficiency.

Using the corrections described above, each pixel will have a corrected measured value at the average scene temperature-corresponding to $A_f$. It is clear that other normalizing values can be used.

Prior art matrix detectors provide poor resolution because the space between the detector elements of the matrix detector is substantial relative to the size of the detector elements themselves. In a preferred embodiment, the invention improves the resolution of the detector by providing transmitting wheel 4 with separate sections II–V.

Preferably, section II includes a plane transmitting element, and sections III–V comprise transmitting wedges which shift the light received from the scene. As transmitting wheel 4 rotates, section II transmits the received radiation to detector plane 8 without any shift. Section III, however, transmits the received radiation to detector plane 8 shifted by ½ pixel to the right, where the length of a pixel is defined as the distance between the centers of two adjacent detector elements in the matrix. Similarly, section IV transmits the received radiation to detector plane 8 shifted by ½ pixel up, and section V transmits the received radiation to detector plane 8 shifted by ½ pixel right and ½ pixel up. Since during each frame, each detector element detects radiation from four different points in the scene, the detector matrix provides much higher resolution than a detector without the wedges. For example, if the matrix detector is composed of 256×256 detector elements, providing transmitting wheel 4 with the four sections II–V, allows the matrix to provide nearly the resolution of a 512×512 matrix.

It is sometimes desirable to more accurately calibrate the detector matrix. In the calibration method described above, the calibration factor is calculated as: $C=M_f-A_f$. This method effectively calibrates (i.e., normalizes) the detector element using the point on the detector element's calibration curve corresponding to the average temperature of the scene; i.e. the point ($A_f,M_f$), and uses this value for the varying brightness of the scene. This point is plotted in FIG. 5, which shows a portion of the calibration curve of a detector element. Since the temperature of the portion of the scene viewed by the detector element is generally not equal to the average temperature of the scene, it is often desirable to additionally calculate the slope of the detector element's calibration curve at the average temperature of the scene, in order to perform a more accurate calibration. If the slope of the calibration curve at the point ($A_f,M_f$) is S (a preferred method of determining S will be described below), then the corrected measured value ($M_c$) corresponding to any uncorrected measured value ($M_u$) detected during the frame, can be found by the simple formula: $M_c=S*M_u+K$, where K is a constant.

By taking into account the dependence of the calibration on the actual temperature of the portion of the scene viewed by the individual element, the above equation calibrates the detector elements more accurately than the previously described embodiment.

Figure 1:
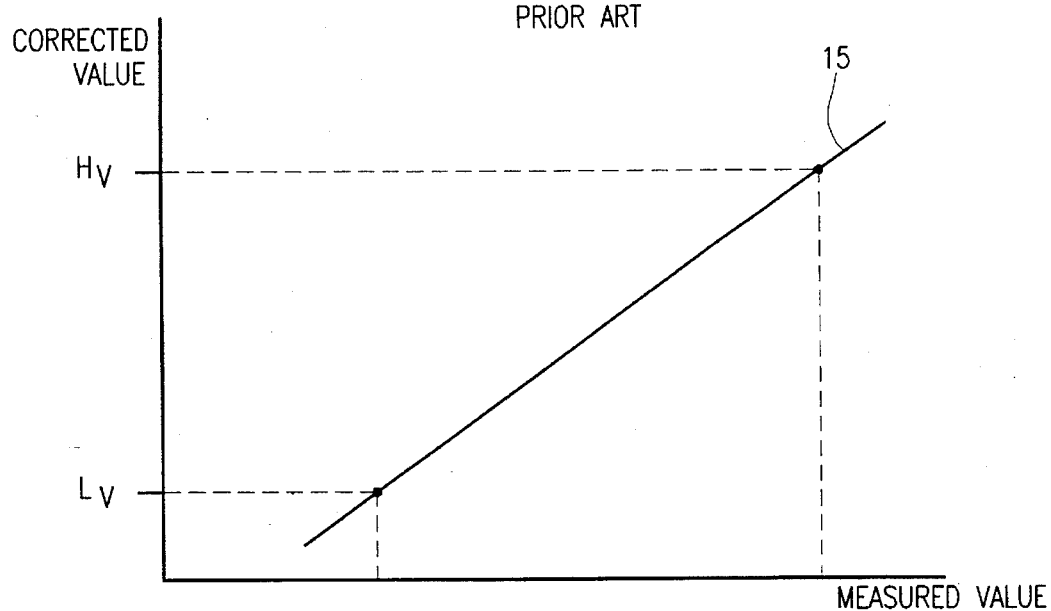
FIG. 1 shows a calibration curve for a detector element of a matrix detector in a prior art method.
Figure 5:
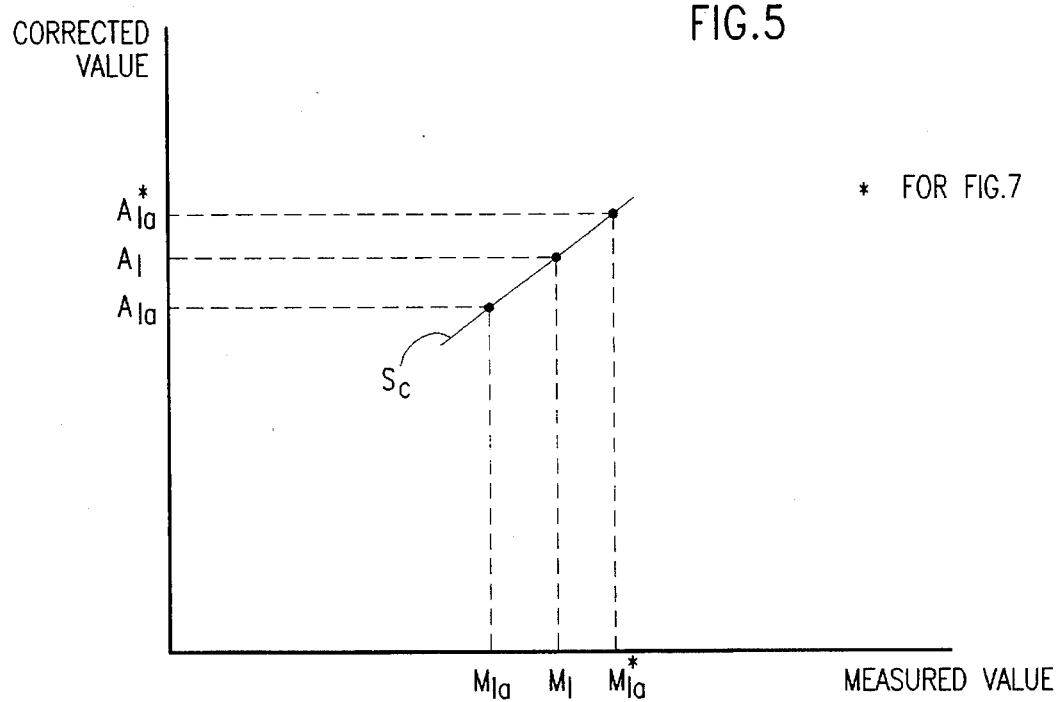
FIG. 5 shows a graph used to plot a detector element's measured value vs. actual value.

The slope S of the portion of the calibration curve shown in FIG. 5 can be found in many ways. The portion of the curve shown in FIG. 5 is short (not to scale) and is approximated by a straight line. One preferred method of determining slope S will be described.

Figure 6:
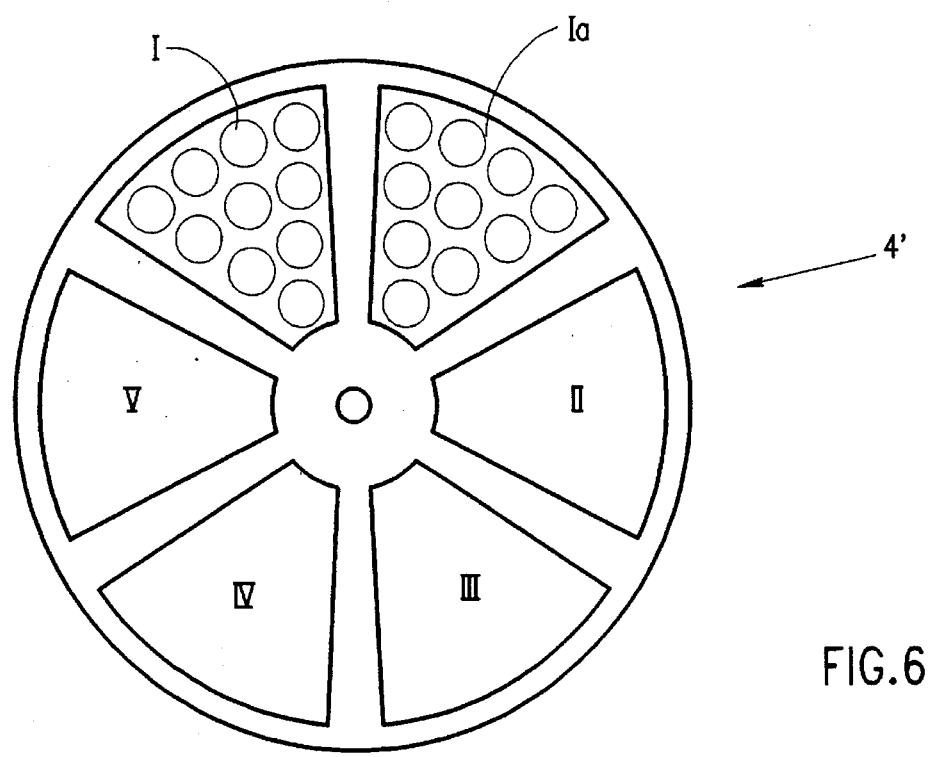
FIG. 6 shows a front view of transmitting wheel according to other preferred embodiments of the present invention.
Figure 7:
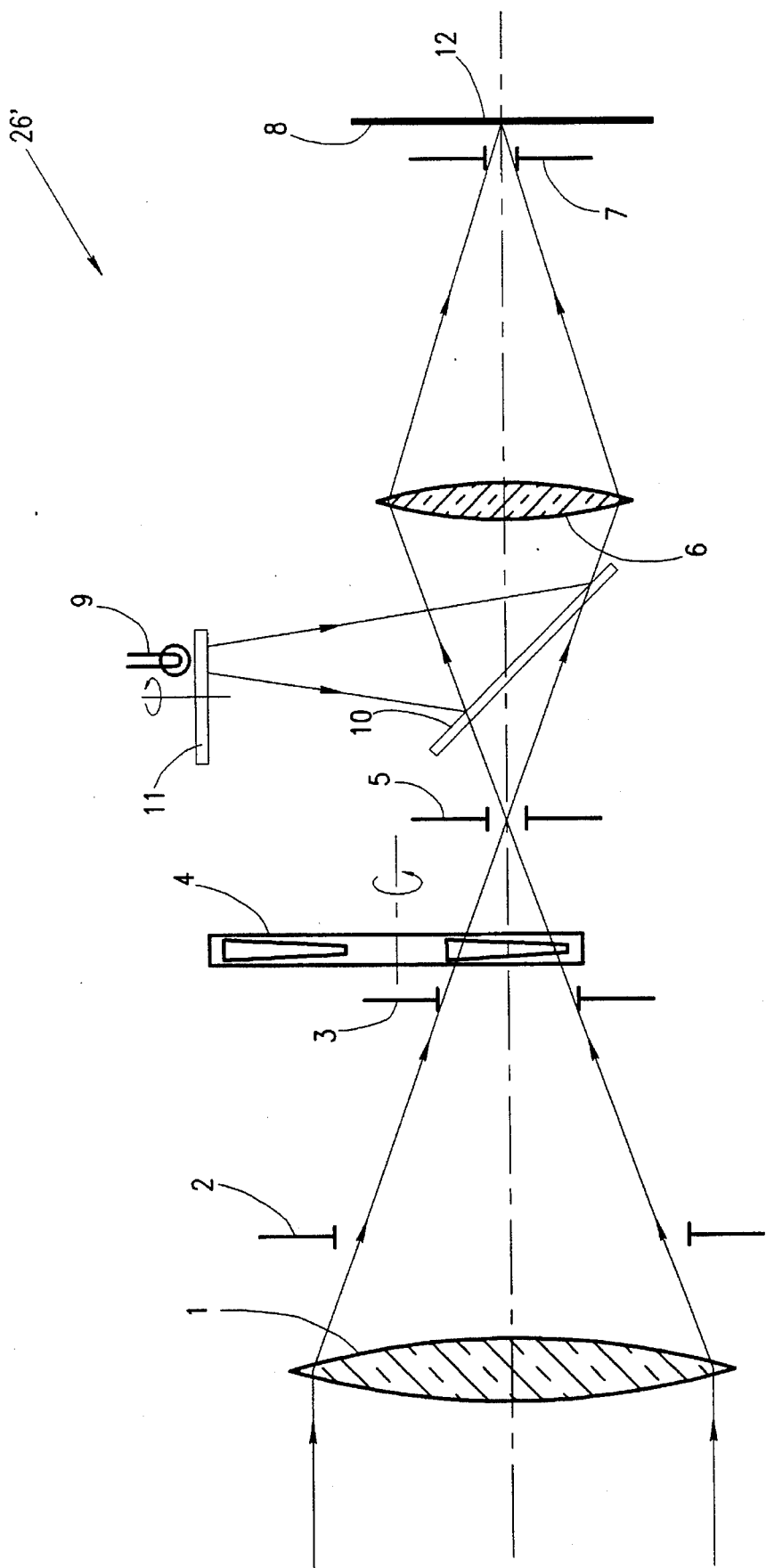
FIG. 7 shows another preferred embodiment of the detector system of the present invention.

In this method, transmitting wheel 4' is provided with six sections (instead of 5) as shown in FIG. 6. Section Ia contains optics which are the same as those of section I. When the radiation passes through section Ia of transmitting wheel 4', an additional light source adds a known amount of light to the average scene radiation. The apparatus for implementing this method is shown in FIG. 7. As is shown in FIG. 7, a light source 9 emits radiation in a direction generally perpendicular to the radiation received from the scene. A beam splitter 10 reflects some of this perpendicular radiation onto detector plane 8. In a typical embodiment, beam splitter 10 is a 95/5 beam splitter, so 5% of the perpendicular radiation is reflected onto detector plane 8.

Beam splitter 10 is located at a distance from the detector plane, such that the reflected light from light source 9 is distributed evenly over the entire detector plane 8. A rotating chopper wheel 11 is placed between light source 9 and beam splitter 11, and is synchronized with transmitting wheel 4' so that when the radiation from the scene is transmitted through section Ia of transmitting wheel 4', the radiation from light source 9 is transmitted through a hole in chopper wheel 11. During the rest of the frame, chopper wheel 11 blocks all of the light emitted by light source 9 so that none of it reaches beam splitter 10. Therefore, when the radiation from the scene is transmitted through section I of transmitting wheel 4', the detector elements are illuminated at the average intensity of the scene, and when the radiation from the scene is transmitted through section Ia of transmitting wheel 4', the detector elements are illuminated at the average intensity of the scene plus some known amount.

As in the previous embodiment, the average measured value of the radiation transmitted through section I of the transmitting wheel 4' ($A_f$), is calculated from the values measured by all of the elements in the matrix. This value is considered to be the corrected value for all the elements for the average illumination. The average corrected measured value for the time period of section Ia ($A_{Ia}$), is then computed by adding the known amount of added illumination to the illumination corresponding to the average measured value for the time period of section I. From the two points ($A_I, M_I$) and ($A_{Ia}, M_{Ia}$) (where $M_{Ia}$ is the measured value of the detector element for the time period of section Ia) slope S can be calculated as:

$$S=(A_I-A_{Ia})/(M_I-M_{Ia})$$

An alternative method for calibrating the detector elements which does not give as accurate a calibration as the methods described above, is to defocus the image during the calibration portion of each frame. Since the defocusing the image causes all of the detector elements in an immediate vicinity to be illuminated with approximately the same radiation, a calibration factor (C) for each detector element can be calculated as;

$$C=M_f-A_v$$

where $M_f$ is the measured value of the detector element for the calibration period, and $A_v$ is the average of the measured value of the detector elements in its immediate vicinity for the calibration period. Corrected values for the rest of the frame can then be calculated as:

*corrected value=measured value+C.*

This method, however, causes the detectors's cold shield efficiency to go below 100%, because when an image is defocused, the maximum angle from which radiation is supplied to the matrix detector is increased, and therefore some radiation from outside the scene illuminates the detector elements. Additionally, this method only forms the average value in the immediate vicinity of the detector element, but does not use the temperature of the entire scene to calculate the calibration factor. For these two reasons, calibration by defocusing of the image does not provide as accurate a calibration as the first two methods described above.

It will be appreciated by those skilled in the art that the present invention is not limited to what has been particularly shown and described hereinabove. While several embodiments for implementing the invention have been described, many other embodiments for implementing the invention will occur to those of ordinary skill upon reading this disclosure. Therefore, the scope of the present invention is defined only by the following claims.

We claim:

1. A method of viewing a scene with a detector comprising a matrix of detector elements, comprising the step of:

sequentially illuminating the matrix of elements for first and second time periods wherein each element views a separate portion of the scene during the first time period and each element is illuminated during the second time period by a light intensity level substantially equal to the average intensity of the scene.

2. The method of claim 1, further comprising the steps of:

providing respective first and second measured values of the illumination received by each detector element during the first and second time periods;

generating a calibration factor for each of the detector elements based on the second measured value for that detector; and correcting each detector element's measured value for the first time period using the calibration factor of the detector element.

3. The method of claim 2, wherein the step of generating a calibration factor includes the sub-steps of:

calculating the average of the measured values of the detector elements for the second time period;

subtracting the average value from each detector element's measured value for the second time period.

4. The method of claim 3, wherein the step of correcting each detector element's measured value further includes the sub-step of:

adding the measured value of the detector element for the first time period to the calibration factor for each detector element to form a corrected measured value for the detector element.

5. The method of claim 1, further comprising the step of:

sequentially illuminating the matrix of elements for a third time period such that each element is equally illuminated by a light intensity level related to but not equal to the average intensity of the scene.

6. The method of claim 5, further comprising the steps of:

providing respective first, second and third measured values of the illumination received by each detector element during the first, second and third time periods;

generating a calibration formula for each of the detector elements based on the measured values for the second and third time periods; and correcting each detector element's measured value for the first time period using the calibration formula of the detector element.

7. The method of claim 6, wherein the calibration formula includes a linear relationship $M_c=S*M_u+K$, between the measured values, $M_u$, and corrected measured values $M_c$ for each detector element, where K is a constant.

8. The method of claim 7, wherein the step of generating the calibration formula includes the step of calculating the slope of the linear relationship comprising the steps of:

calculating the average value of the measured values for the second time period; and calculating the average corrected measured value for the third time period.

9. The method of claim 8, wherein the slope, S, of each detector element is found as:

$$S=(M_2-M_3)/(A_2-A_3),$$

where:

$A_2$ and $A_3$ are the average values for the second and third time periods respectively; and $M_2$ and $M_3$ are the measured values of the detector elements for the second and third time periods respectively.

10. The method of claim 8, wherein the constant K is:

$$(A_2-M_2*S).$$

11. The method of claim 5, wherein the light intensity level during the third time period is related by a constant to the light intensity level during the first time period.

12. The method of claim 11 wherein the light intensity level during the third time period is equal to a constant added to the light intensity level during the second time period.

13. The method of claim 1, including the step of:

sequentially varying the portion of the scene viewed by each detector element during the first time period by shifting the illumination received from the scene.

14. The method of claim 13, wherein the distance between the centers of two adjacent detector elements in the matrix is d, and wherein the step of sequentially varying includes the steps of:
- shifting the illumination received from the scene a distance ½ d in a first direction;
- shifting the illumination received from the scene a distance ½ d in a second direction perpendicular to the first direction; and
- shifting the illumination received from the scene a distance ½ d in the first direction and ½ d in the second direction.

15. A method according to claim 1 and also comprising: providing a light transmitting element comprising a plurality of optical elements,
wherein the illuminating comprises illuminating through the light transmitting element.

16. A method according to claim 15 wherein the plurality of optical elements is generally disposed in a single plane.

17. A method according to claim 16 wherein the light transmitting element is positioned at a stop.

18. A method according to claim 16 wherein the light transmitting element also comprises a plurality of light shifting elements.

19. A method according to claim 16 wherein the plurality of optical elements comprises a plurality of lenses.

20. A method according to claim 19 wherein the plurality of lenses comprises a plurality of Fresnel lenses.

21. A method according to claim 18 wherein he plurality of light shifting elements comprises a plurality of generally wedge shaped elements.

22. A detector for viewing a scene comprising:
a matrix of detector elements; and
means for sequentially illuminating the matrix of elements for first and second time periods wherein each element views a separate portion of the scene during the first time period and each element is illuminated during the second time period by a light intensity level substantially equal to the average intensity of the scene.

23. A detector according to claim 22, further includes:
means for providing respective first and second measured values of the illumination received by each detector element during the first and second time periods;
means for generating a calibration factor for each of the detector elements based on the second measured value for that detector; and
means for correcting each detector element's measured value for the first time period using the calibration factor of the detector element.

24. A detector according to claim 23, wherein the means for generating includes:
means for calculating the average of the measured values of the detector elements for the second time period; and
means for subtracting the average value from each detector element's measured value for the second time period.

25. A detector according to claim 24, wherein the means for correcting includes:
means for adding the measured value of the detector element for the first time period by the calibration factor for each detector element to form a corrected measured value for the detector element.

26. A detector according to claim 22 and comprising:
means for sequentially illuminating the matrix of elements for a third time period such that each element is equally illuminated by a light intensity level related to but not equal to the average intensity of the scene.

27. A detector according to claim 26 and comprising:
means for providing respective first, second and third measured values of the illumination received by each detector element during the first, second and third time periods;
means for generating a calibration formula for each of the detector elements based on the measured values for the second and third time periods; and
means for correcting each detector element's measured value for the first time period using the calibration formula of the detector element.

28. A detector according to claim 26 and comprising:
means for providing respective first, second and third measured values of the illumination received by each detector element during the first, second and third time periods;
means for generating a calibration formula for each of the detector elements based on the measured values for the second and third time periods, wherein the calibration formula includes a linear relationship $M_c=S*M_u+K$, between the measured values, $M_u$, and corrected measured values $M_c$ for each detector element, where K is a constant; and
means for correcting each detector element's measured value for the first time period using the calibration formula of the detector element.

29. A detector according to claim 28, wherein the means for generating includes means for calculating the slope of the linear relationship comprising:
means for calculating the average value of the measured values for the second time period; and
means for calculation the average value of the measured values for the third time period.

30. A detector according to claim 29 including means for determining the slope of each detector element, $$S=(M_2-M_3)/(A_2-A_3),$$

where:
$A_2$ and $A_3$ are the average values for the second and third time periods respectively; and
$M_2$ and $M_3$ are the measured values of the detector elements for the second and third time periods respectively.

31. A detector according to claim 29 including means for determining the constant $K=(A_2-M_2*S)$.

32. A detector according to claim 26 wherein the means for sequentially illuminating during the third time period includes means for illuminating with illumination having an intensity level during the third time period which is related by a constant to the light intensity level during the first time period.

33. A detector according to claim 26 wherein the means for sequentially illuminating during the third time period includes means for illuminating with illumination having an intensity level during the third time period which is equal to a constant added to the light intensity level during the second time period.

34. A detector according to claim 22 and including means for sequentially varying the portion of the scene viewed by each detector element during the first time period by shifting the illumination received from the scene.

35. A detector according to claim 34 wherein the distance between the centers of two adjacent detector elements in the matrix is d, and wherein the means for sequentially varying includes:

means for shifting the illumination received from the scene a distance ½ d in a first direction;

means for shifting the illumination received from the scene a distance ½ d in a second direction perpendicular to the first direction; and means for shifting the illumination received from the scene a distance ½ d in the first direction and ½ d in the second direction.

36. Apparatus according to claim 22 and also comprising:
a light transmitting element comprising a plurality of optical elements,
wherein the means for sequentially illuminating is operative to illuminate the matrix through the light transmitting element.

37. Apparatus according to claim 36 wherein the plurality of optical elements is generally disposed in a single plane.

38. Apparatus according to claim 37 wherein the light transmitting element is positioned at a stop.

39. Apparatus according to claim 37 wherein the light transmitting element also comprises a plurality of light shifting elements.

40. Apparatus according to claim 37 wherein the plurality of optical elements comprises a plurality of lenses.

41. Apparatus according to claim 40 wherein the plurality of lenses comprises a plurality of Fresnel lenses.

42. Apparatus according to claim 39 wherein the plurality of light shifting elements comprises a plurality of generally wedge shaped elements.

43. A detector for detecting illumination emitted by a scene, comprising:
a. a planar matrix of detector elements, each of the detector elements providing an output value representative of the amount of light received thereby during a period of time;
b. optics for focusing the illumination emitted by the scene onto the detector plane;
c. a rotatable wheel located in the path of the illumination, comprising:
a first section having optical lenses which spread the illumination emitted by the scene such that each of the detector elements is illuminated by a light intensity level substantially equal to the average intensity of the scene, and
a second section having optics which allow the illumination emitted by the scene to pass to the detector plane without modification; and
d. means for rotating the rotatable wheel.

44. A detector according to claim 43, further comprising a processor connected to receive the values provided by the detector elements.

45. A detector according to claim 43, wherein the rotatable wheel further comprises:

a third section having optics which shift the illumination emitted by the scene in a first direction, a fourth section having optics which shift the illumination emitted by the scene in a second direction perpendicular to the first direction, and a fifth section having optics which shift the illumination emitted by the scene in both the first and second directions.

46. A detector according to claim 43 wherein the rotatable wheel further comprises an additional section comprising optical lenses identical to those of the first section; and
the detector further comprises an additional light source operative to supply additional light to the matrix detector only when the light from the scene is transmitted through the additional section of the filter.

47. A detector for detecting illumination emitted by a scene, comprising:
a. a planar matrix of detector elements;
b. optics for focusing the illumination emitted by the scene onto the detector plane;
c. a plurality of optical sections, arranged so that the light emitted by the scene passes through only one section at a time, the sections comprising:
a first section having optical lenses which transmit the illumination emitted by the scene such that each of the detector elements is illuminated by a light intensity level substantially equal to the average intensity of the scene, and
a second section having optics which allow the illumination emitted by the scene to pass to the detector plane without modification; and
d. means for sequentially supplying the light from the scene to the planar matrix via each of the plurality of optical sections.

48. A detector for detecting illumination emitted by a scene, comprising:
a planar matrix of detector elements wherein the distance between the centers of two adjacent detector elements in the matrix is d;

optics for focusing the illumination on the detector plane;

means for shifting the illumination received from the scene a distance ½ d in a first direction;

means for shifting the illumination received from the scene a distance ½ d in a second direction perpendicular to the first direction; and means for shifting the illumination received from the scene a distance ½ d in the first direction and ½ d in the second direction.

* * * * *